(12) United States Patent
Baltes et al.

(10) Patent No.: US 8,930,710 B2
(45) Date of Patent: Jan. 6, 2015

(54) USING A MANIFEST TO RECORD PRESENCE OF VALID SOFTWARE AND CALIBRATION

(75) Inventors: Kevin M. Baltes, Wixom, MI (US);
James T. Kurnik, Linden, MI (US);
Ronald J. Gaynier, Ann Arbor, MI (US); Thomas M. Forest, Macomb, MI (US); Ansaf I. Alrabady, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 353 days.

(21) Appl. No.: 13/557,060

(22) Filed: Jul. 24, 2012

(65) Prior Publication Data

US 2013/0111271 A1    May 2, 2013

Related U.S. Application Data

(60) Provisional application No. 61/552,968, filed on Oct. 28, 2011.

(51) Int. Cl.
G06F 11/30 (2006.01)
G06F 11/26 (2006.01)

(52) U.S. Cl.
CPC ............. *G06F 11/261* (2013.01); *G06F 11/26* (2013.01)
USPC ........................................ 713/187; 380/273

(58) Field of Classification Search
CPC .... G06F 11/261; G06F 11/3664; G06F 11/26
USPC ........................................ 713/187; 380/273
See application file for complete search history.

(56) References Cited

U.S. PATENT DOCUMENTS

| | | | | |
|---|---|---|---|---|
| 5,619,698 | A | * | 4/1997 | Lillich et al. ................... 717/168 |
| 6,505,105 | B2 | * | 1/2003 | Hay et al. ...................... 701/33.1 |
| 6,550,052 | B1 | * | 4/2003 | Cramer et al. ................. 717/100 |
| 2008/0133823 | A1 | * | 6/2008 | Laichinger et al. ........... 711/103 |
| 2011/0138188 | A1 | * | 6/2011 | Lee et al. ....................... 713/187 |

OTHER PUBLICATIONS

Jung et al. "Fault Tolerant Protocol for CAN Flash Programming", The 13th International Pacific Conference on Automotive Engineering, Aug. 22-24, 2005, 6 pages.*

* cited by examiner

*Primary Examiner* — Saleh Najjar
*Assistant Examiner* — Oleg Korsak
(74) *Attorney, Agent, or Firm* — John A. Miller; Miller IP Group, PLC

(57) ABSTRACT

A system and method for verifying that operating software and calibration files are present and valid after a bootloader flashes the files into the memory on a vehicle ECU before allowing the operating software to execute. The ECU memory defines a memory segment for the operating software and the calibration files. A software manifest is provided in a memory slot before the operating software segment in the memory. Likewise, a calibration manifest is provided in a memory slot before the calibration segment in the ECU memory. After the software has been flashed into the ECU memory, a software flag is set in the software manifest memory slot and each time a calibration file is flashed, a calibration flag for the particular calibration file is set in the calibration manifest.

20 Claims, 2 Drawing Sheets

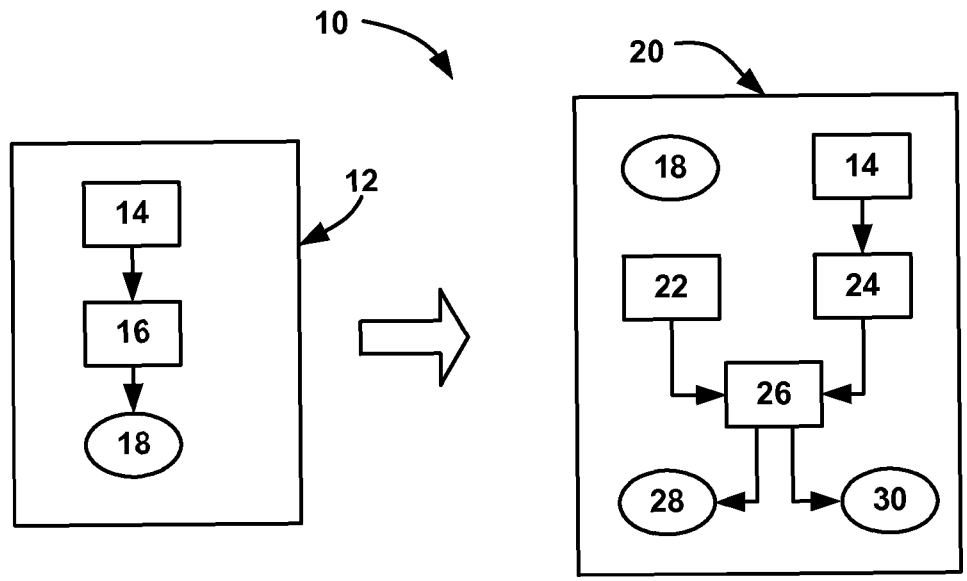
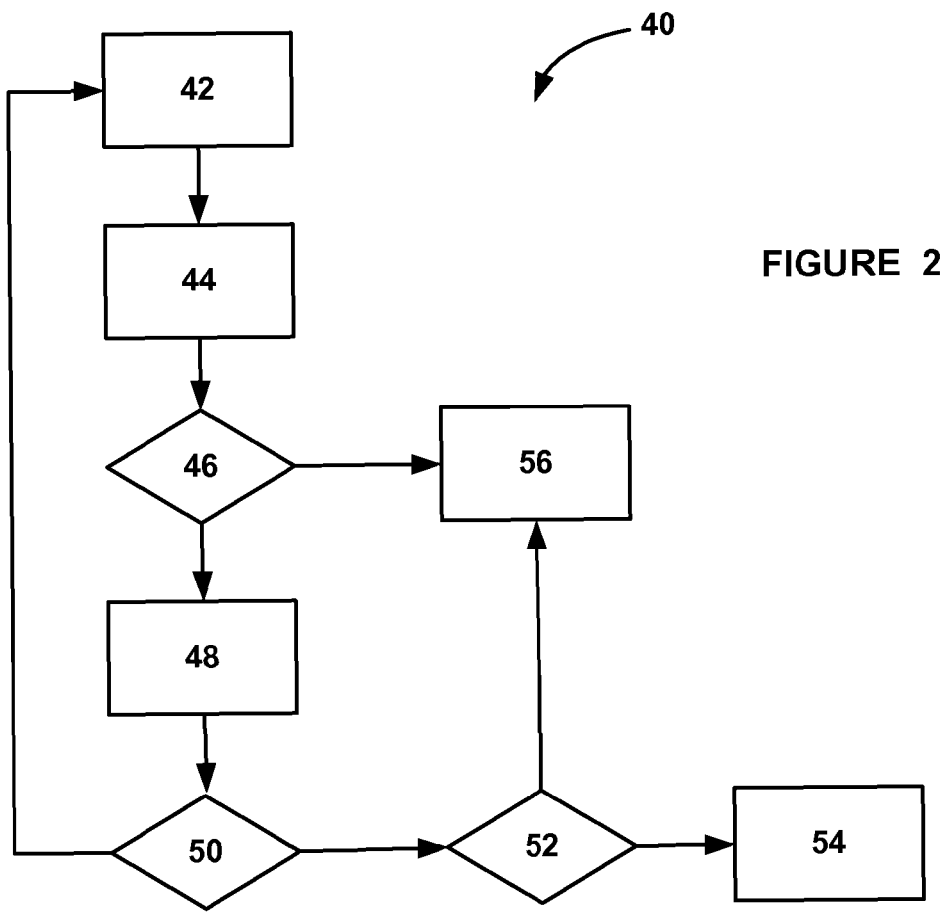
FIGURE 1
FIGURE 2

USING A MANIFEST TO RECORD PRESENCE OF VALID SOFTWARE AND CALIBRATION

CROSS-REFERENCE TO RELATED APPLICATIONS

This application claims the benefit of the priority date of U.S. Provisional Patent Application Ser. No. 61/552,968, titled, Using a Manifest to Record Presence of Valid Software and Calibration, filed Oct. 28, 2011.

BACKGROUND OF THE INVENTION

1. Field of the Invention

This invention relates generally to a system and method for determining that operating software and/or calibration files are present and valid after a bootloader flashes the files into the memory of a controller before allowing the operating software to execute in the controller and, more particularly, to a system and method for determining that operating software and/or calibration files are present and valid after a bootloader flashes the files into the memory of a vehicle electronic control unit (ECU) before allowing the operating software to execute in the ECU, where the method includes creating a programming manifest at the beginning of a memory segment for both the operating software and the calibration files that identifies that all of the programmable parts in the software and calibration memory segments are valid.

2. Discussion of the Related Art

Most modern vehicles include electronic control units (ECUs), or controllers, that control the operation of vehicle systems, such as the powertrain, climate control system, infotainment system, body systems, chassis systems, and others. Such controllers require special purpose-designed software in order to perform the control functions. With the increasing number and complexity of these controllers, and the growing threat posed by developers of malicious software, it is more important than ever to authenticate the source and content of binary files that are loaded on automotive controllers. The consequences of using software that is not properly validated, or worse, maliciously-designed, in a vehicle controller include unintended behavior of the vehicle or its systems, loss of anti-theft features on the vehicle, potential tampering with components such as the odometer, and loss of other vehicle features and functions.

One know digital coding technique is referred to as asymmetric key cryptography that uses digital signatures for authenticating files that are programmed into controllers. As would be understood by those skilled in the art, asymmetric key cryptography uses a pair of mathematically-related keys, known as a private key and a public key, to encrypt and decrypt a message. To create a digital signature, a signer uses his private key, which is known only to himself, to encrypt a message. The digital signature can later be decrypted by another party using the public key, which is paired to the signer's private key.

Flashing is a well known process for uploading software, calibration files and other applications into the memory of a vehicle ECU or other programmable device. A bootloader is an embedded software program loaded in the memory of the ECU that provides an interface between the ECU and a programming device that is flashing the software. The bootloader flashes the operating software and calibration files into the ECU memory, where the operating software provides the software that causes the various vehicle functions to operate in conjunction with each other and the calibration files are the various vehicle configuration and tuning parameters, such as binary switches, thresholds, etc., for the particular vehicle systems. The bootloader typically employs asymmetric key cryptography and stores a public key that must be used to decode a digital signature transferred by the programming device before uploading to or reflashing of the ECU is allowed to prevent malicious software or calibration files from being uploaded into the ECU.

Upon ECU powering up and/or resetting, the bootloader can determine that the operating software and/or calibration files are present and valid by checking for the occurrence of specific digital patterns, known as a "presence pattern" within software and/or calibration file memory blocks. However, there are several drawbacks with this flashing validation process. For example, the bootloader has to "know" where the presence patterns are located, even if the patterns can be moved in fixed memory increments. Further, software and calibration re-partitioning may render the bootloader incompatible with the software and calibration files stored in the memory. Also, because the presence patterns are included in the software and calibration files, the patterns exist before the integrity check is performed. Thus, there is a window of opportunity between when the presence patterns are written and when the integrity check is performed where a hacker could write malicious software/calibrations into the ECU and stop the programming operation, such as by unplugging the battery. This would allow the malicious software/calibrations to be executed.

One known global bootloader specification protocol allows the bootloader to write the presence patterns after the integrity check passes after flashing completes. However, there still exists the issue that since the presence pattern is in the last software or calibration file, it is not known what files are in the other preceding software or calibration files. For example, a person could erase the calibration memory segment, flash in malicious files in all of the memory segments and write a valid presence pattern. Stated differently, known techniques for flashing software and calibration files during the flashing process follow a procedure where multiple files would be flashed and then the bootloader would verify the integrity of the flashed files by ensuring that the last file was flashed correctly. This presents a security issue in that a hacker may properly flash the last file, which the bootloader uses to verify that all of the files before the last file have been flashed properly, where the hacker may have maliciously flashed improper software or calibration files prior to the last file. In this scenario, the hacker that provides the valid last software or calibration file, but writes malicious previous software or calibration files, may cause the bootloader to exit the bootloader to run the operating software because the bootloader will believe that all of the files have been properly flashed.

SUMMARY OF THE INVENTION

In accordance with the teachings of the present invention, a system and method are disclosed for verifying that operating software and/or calibration files are present and valid after a bootloader flashes the files into the memory on a vehicle ECU before allowing the operating software to execute. The ECU memory defines a memory segment for each of the operating software and the calibration files. A software manifest is provided in a memory slot before the operating software segment in the ECU memory. Likewise, a calibration manifest is provided in a memory slot before the calibration segment in the ECU memory. After the software has been flashed into the ECU memory, a software flag is set in the software manifest memory slot, and each time a calibration file is flashed, a calibration flag for the particular calibration file is set in the calibration manifest. The bootloader checks to see if all of the flags have been properly set after the flash to determine that the operating software and calibration files have been properly flashed before the bootloader allows the operating software to execute.

Additional features of the present invention will become apparent from the following description and appended claims, taken in conjunction with the accompanying drawings.

BRIEF DESCRIPTION OF THE DRAWINGS

FIG. 1 is a block diagram of a system showing the operation of digital signature verification process;

FIG. 2 is a flow chart diagram showing a process for identifying if operating software and calibration parts are present and valid in an ECU memory to allow a bootloader to execute the operating software;

DETAILED DESCRIPTION OF THE EMBODIMENTS

Figure 3:
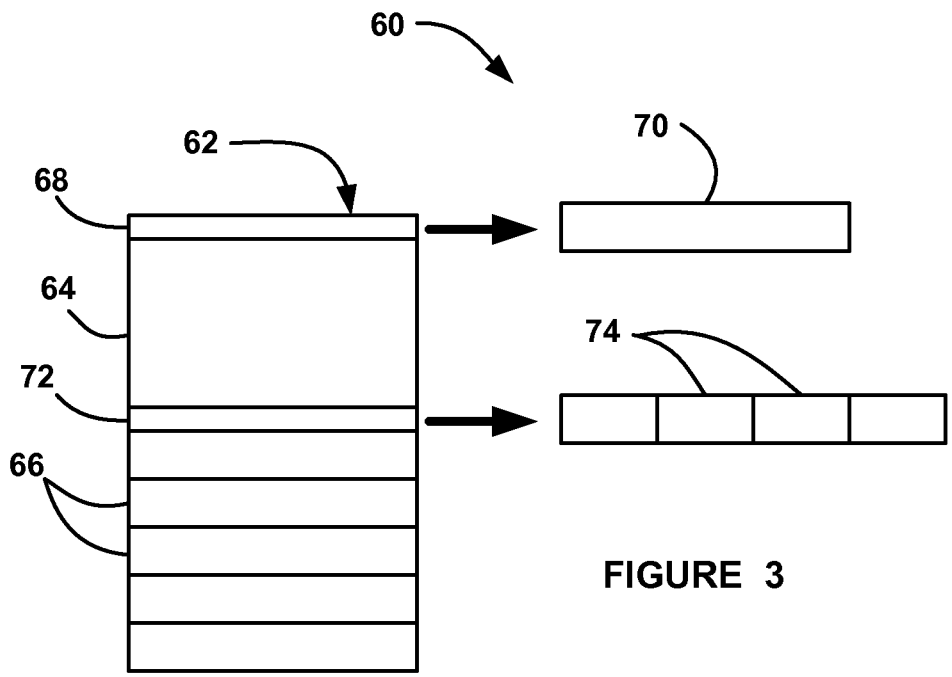
FIG. 3 is a representation of a memory in the ECU showing programming manifests including flags that identify that the software and calibration files are present and valid.

The following discussion of the embodiments of the invention directed to a system and method for determining that operating software and/or calibration files are present and valid after a bootloader has flashed the operating software and calibration files into a vehicle ECU before allowing the operating software to execute is merely exemplary in nature, and is in no way intended to limit the invention or its applications or uses. For example, the discussion herein relates to verifying software and calibration files have been properly flashed into a vehicle ECU. However, as will be appreciated by those skilled in the art, the system and method may have application for flashing software and/or calibration files into other types of controllers.

FIG. 1 is a block diagram 10 of a known method for using asymmetric key digital signatures for authenticating files that are programmed into controllers. As would be understood by those skilled in the art, asymmetric key cryptography uses a pair of mathematically-related keys known as a private key and a public key to encrypt and decrypt a message. To create a digital signature, a signer uses his private key, which is known only to himself, to encrypt a file or message. The digital signature can later be decrypted by another party using the public key, which is paired to the signer's private key to authenticate a file or message.

In a signing step 12, a content file 14 is provided, where the content file 14 could be a piece of software, a calibration file, or other "soft-part" content to be used in a controller. A hash calculation is performed on the content file 14 to produce a hash value 16. The hash value 16 is then encrypted with the signer's private key to produce a digital signature 18, where the digital signature 18 is only good for that particular content file 14.

The digital signature 18 and the content file 14 are then used in a verifying step 20, which would be performed by the bootloader in the ECU in the application being discussed herein. The digital signature 18 is decrypted using the signer's public key to produce a hash value 22. Meanwhile, a hash calculation is performed on the content file 14 by the verifier to produce a calculated hash value 24. At box 26, the decrypted hash value 22 is compared to the calculated hash value 24. If the decrypted hash value 22 matches the calculated hash value 24, then a valid determination at oval 28 is issued, and the content file 14 is used. If the decrypted hash value 22 does not match the calculated hash value 24, then an invalid determination at oval 30 is issued, and the content file 14 is not used.

The present invention proposes a technique for validating that an operating software has been properly flashed into the memory of a vehicle ECU using a bootloader. The technique allocates a predetermined memory space at a first software flash section in a memory segment for the software, where the software code immediately follows the memory space. The memory space is defined as a software programming manifest that identifies that the operating software has properly been flashed, for example, by setting a flag in the software manifest. The first memory segment is used as the software manifest because it is erased first during software reprogramming to record the software programming results. The memory space for the manifest is an increment of the smallest write size permitted by the bootloader flash. The software being flashed does not overwrite this memory space. After the bootloader programs the software, the results of an integrity check, such as digital signature verification described above, are recorded in the manifest.

The present invention also proposes a technique for validating that calibration files have been properly flashed into the memory of a vehicle ECU using a bootloader. The technique allocates a predetermined memory space at a first calibration file flash section in a memory segment for the calibration files, where the calibration file code immediately follows the memory space. The memory space is defined as a calibration file programming manifest that identifies that the calibration files have properly been flashed, for example, by setting a flag in the calibration file manifest. The first memory segment is used as the calibration file manifest because it is erased first during calibration file reprogramming to record the calibration file results. The memory space for the manifest is an increment of the smallest write size permitted by the bootloader flash. The calibration files being flashed do not overwrite this memory space. After the bootloader programs each calibration file, the results of the integrity check are recorded in the manifest space.

Upon an ECU reset, the bootloader will check all software and calibration flags in the software and calibration file manifests. If all of the flags are valid, then a transfer to the operating software is permitted. Otherwise, the bootloader stays in the boot mode.

FIG. 2 is a flow chart diagram 40 showing a process for using programming manifests to record the presence of valid software and/or calibration files when flashing the operating software and/or calibration files to the memory on a vehicle ECU by a bootloader flashing process. A bootloader programming executive at box 42 controls the bootloader programming function, and this function may be entered via request by a service tool at a servicing facility. The bootloader programming executive detects a request to program software or calibration and enters box 44 to perform some operation, such as uploading or flashing the operating software and/or calibration files for the particular vehicle ECU. Each time the bootloader flashes an operating software or calibration file, it first erases the appropriate memory segment(s), which sets the flag(s) in a programming manifest memory space indicating that the software or particular calibration file has not been properly flashed. At decision diamond 46, the bootloader determines whether a valid flash has occurred each time a separate piece of software or calibration file is flashed by determining that the flag has been properly set in the manifest.

If the operating software or calibration file has been properly flashed at the decision diamond 46, then the bootloader performs an integrity check and updates the programming manifest at box 48. The bootloader then determines whether all of the operating software and calibration files have been properly flashed at decision diamond 50, and if not, returns to the bootloader programming executive at the box 42 to flash the next piece of software or calibration file. If all of the software and/or calibration files are properly flashed at the decision diamond 50, then the bootloader determines whether all of the operating software and calibration file flags in the programming manifest have been properly set and are valid at decision diamond 52, and if so, allows execution of the operating software at box 54. If a valid flash of a particular operating software calibration file at the decision diamond 46 has not occurred or all the programming flags are not valid at the decision diamond 52, then the bootloader sends a negative response message to the requester, such as the programming tool, at box 56 indicating that the flashing has not properly occurred.

FIG. 3 is a representation of a portion of an ECU memory 60 including a flash memory segment 62 that stores operating software and calibration files that are flashed by the bootloader. In this representation of the flash segment 62, the bootloader stores one operating software file and four calibration files for the particular application, which is by way of a non-limiting embodiment. The operating software is flashed into a memory section 64 and the calibration files are flashed into memory sections 66. As discussed above, a programming manifest is defined in the memory segment 62 for both the operating software and the calibration files, and that manifest is at the beginning of the memory segment for the operating software or the calibration files. In this example, the software manifest is stored at memory slot 68 before the software memory section 64 and only includes a single software flag 70 because the operating software only includes a single part, namely, the operating software stored in the segment 64. Likewise, the calibration manifest is located at memory slot 72 before the calibration files in the memory sections 66, where the calibration manifest stores a calibration flag 74 for each of the separate calibration files, which would be four calibration flags in this example. As mentioned above, the manifest memory space is provided at the beginning of the memory segment for the operating software and calibration files because this space would be the first part of the memory to be erased if the operating software or the particular calibration file were reprogrammed with new files, where a new flag would need to be set in the manifest for those new files. Note since the calibration files all reside in the same memory segment, all calibration files must be programmed during any calibration flashing event and the segment is erased once before writing the first calibration file.

Figure 4:
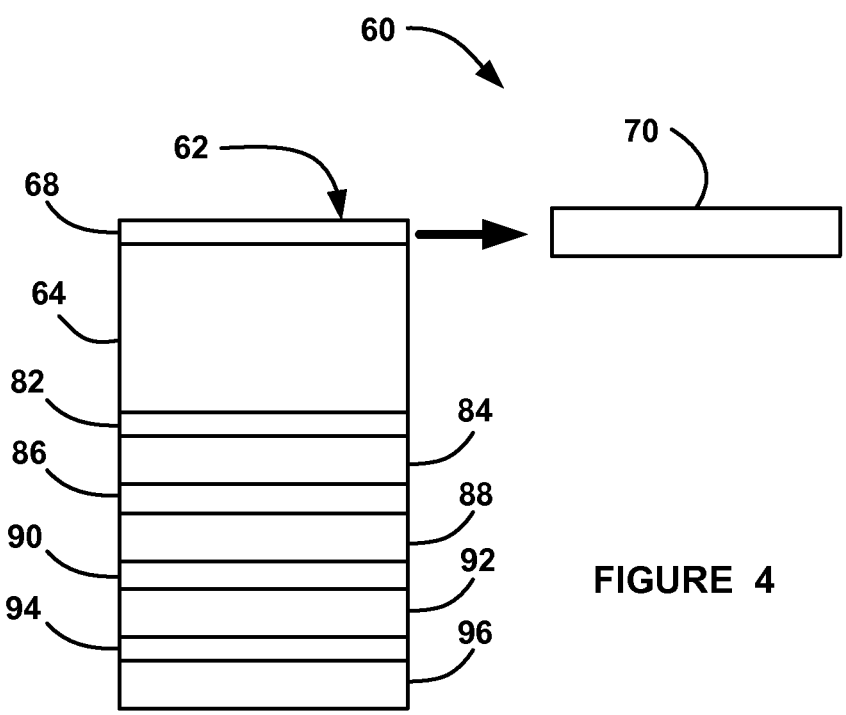
FIG. 4 is another representation of a memory in the ECU showing programming manifests including flags that identify that the software and calibration files are present and valid.

FIG. 4 is another representation of a portion of an ECU memory 80 where like elements to the ECU memory 60 are identified by the same reference numeral. In the ECU memory 80, instead of there being a signal calibration manifest for all of the calibration files immediately preceding the calibration files, a calibration manifest including a calibration flag is provided immediately preceding each of the calibration files. For example, in this embodiment, a calibration manifest is provided at memory slot 82 for a calibration file stored in memory section 84 and includes a single calibration flag, a calibration manifest is provided at memory slot 86 for a calibration file stored in memory section 88 and also includes a single calibration flag, a calibration manifest is provided in memory slot 90 for a calibration file stored in memory section 92 and also includes a single calibration flag, and a calibration manifest is provided at memory slot 94 for a calibration file stored in memory section 96 and also includes a single calibration file. The configuration of the ECU memory 80 may have benefits over the configuration of the ECU memory 60 because the calibration files may be flashed to different calibration segments that are not contiguous with each other where a calibration manifest would be provided at the beginning of the separate calibration segments that may be overwritten when the new calibration file is downloaded.

In another embodiment that may be a combination of the ECU memories 60 and 80, the knowledge of what segments in the ECU memory are flashed for one or more calibration files may determine how many flags are in the calibration manifest, where one flash segment may include a single calibration file and other flash segments may include multiple calibration files.

In yet another approach, there may be one flag for the entire flash segment regardless of whether there are more than one calibration file in that segment. The bootloader would ensure that all of the calibration files are programmed before that flag is set by enforcing a programming sequence of the calibration files. For example, each calibration file would be given a specific sequence ID, and flashing of the calibration files would be performed in the order of those IDs. For example, a calibration file with a sequence ID of 3 would not be flashed before a calibration file with a sequence ID of 2. In this embodiment, programming of the calibration file being flashed must be successful, i.e., the signature must be valid, before the next calibration file is flashed. After the last calibration file is written and verified, the bootloader sets the flag to indicate successful programming for all of the calibration files in that segment.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for verifying that operating software and calibration files have been properly flashed into a controller before allowing the operating software to be executed in the controller, said method comprising:

defining a memory segment in a controller memory for storing the operating software and one or more calibration files;

reserving a software memory section for the operating software and one or more calibration file memory sections for the one or more calibration files in the memory segment;

flashing the operating software into the software memory section;

setting a software flag in a software manifest memory slot in the software memory section that indicates that the operating software has been properly flashed and verified;

flashing the one or more calibration files into the one or more calibration file memory sections;

setting a calibration flag for each separate calibration file in at least one calibration file manifest memory slot in the one or more calibration file memory sections that indicates that the particular calibration file has been properly flashed and verified; and verifying that all of the operating software and calibration file flags have been properly set before allowing the operating software to be executed by the controller.

2. The method according to claim 1 wherein the software manifest precedes the operating software in the software memory section.

3. The method according to claim 1 wherein the at least one calibration file manifest precedes the one or more calibration files in the calibration file memory section.

4. The method according to claim 1 wherein reserving one or more calibration file memory sections for the one or more calibration files includes reserving a plurality of calibration file memory sections for a plurality of calibration files where a single calibration file is provided in each calibration file memory section, and wherein flashing the one or more calibration files into the one or more calibration file memory sections includes flashing a separate calibration file into each of the plurality of calibration file memory sections.

5. The method according to claim 4 wherein the plurality of calibration file memory sections are contiguous with each other.

6. The method according to claim 5 wherein setting a calibration flag for each separate calibration file includes setting a calibration flag in a single calibration file manifest memory slot that stores all of the calibration flags for all of the calibration files.

7. The method according to claim 4 wherein setting the calibration flag for each separate calibration file includes providing a separate calibration file memory slot for each calibration file that includes a single calibration flag.

8. The method according to claim 7 wherein the plurality of calibration file memory sections are not contiguous with each other.

9. The method according to claim 1 wherein the controller is an electronic control unit (ECU) on a vehicle.

10. A method for verifying that one or more software files has been properly flashed into a memory of an electronic control unit (ECU) on a vehicle before allowing the one or more software files to be executed in the ECU, said method comprising:

defining at least one memory segment in the memory of the ECU for storing at least one software file;

reserving a memory section for the at least one software file in the memory segment;

flashing the at least one software file into the memory section;

setting at least one software flag in a software manifest memory slot in the software memory section that indicates that the at least one software file has been properly flashed; and verifying that the software flag has been properly set before allowing the software file to be executed by the controller.

11. The method according to claim 10 wherein defining at least one memory segment includes defining a memory segment for storing operating software, and wherein reserving a memory section for the at least one software file includes reserving a memory section for the operating software, and wherein flashing the at least one software file into the memory section includes flashing the operating software into the memory section, and wherein setting at least one software flag in a software manifest memory slot includes setting an operating software flag in an operating software manifest slot immediately preceding the memory segment.

12. The method according to claim 10 wherein defining at least one memory segment includes defining memory segments for storing a plurality of calibration files, and wherein reserving a memory section for the at least one software file includes reserving a separate memory section from a plurality of memory sections for each of the calibration files, and wherein flashing the at least one software file into the memory section includes flashing the plurality of calibration files into the memory sections, and wherein setting at least one software flag in a software manifest memory slot includes setting a separate calibration flag for each calibration file in one or more calibration flag manifest slots.

13. The method according to claim 12 wherein the plurality of calibration file memory sections are contiguous with each other.

14. The method according to claim 13 wherein setting a calibration flag for each separate calibration file includes setting a calibration flag in a single calibration file manifest memory slot that stores all of the calibration flags for all of the calibration files.

15. The method according to claim 12 wherein setting the calibration flag for each separate calibration file includes providing a separate calibration file memory slot for each calibration file that includes a single calibration flag.

16. The method according to claim 15 wherein the plurality of calibration file memory sections are not contiguous with each other.

17. The method according to claim 10 wherein the memory segment stores multiple software files where each software file includes a separate software file ID and wherein flashing the software files includes flashing the software files into the memory segment in a predetermined sequence based on the IDs.

18. A system for verifying that one or more software files has been properly flashed into a memory of the controller before allowing the one or more software files to be executed in the controller, said system comprising:

means for defining at least one memory segment in the memory of the controller for storing at least one software file;

means for reserving a memory section for the at least one software file in the memory segment;

means for flashing the at least one software file into the memory section;

means for setting at least one software flag in a software manifest slot in the software memory section that indicates that the at least one software file has been properly flashed; and means for verifying that the software flag has been properly set before allowing the software file to be executed by the controller.

19. The system according to claim 18 wherein the means for defining at least one memory segment defines a memory segment for storing operating software, and wherein the means for reserving a memory section for the at least one software file reserves a memory section for the operating software, and wherein the means for flashing the at least one software file into the memory section flashes the operating software into the memory section, and wherein the means for setting at least one software flag in a software manifest memory slot sets an operating software flag in an operating software manifest slot immediately preceding the memory segment.

20. The system according to claim 18 wherein the means for defining at least one memory segment defines memory segments for storing a plurality of calibration files, and wherein the means for reserving a memory section for the at least one software file reserves a separate memory section from a plurality of memory sections for each of the calibration files, and wherein the means for flashing the at least one software file into the memory section flashes the plurality of calibration files into the memory sections, and wherein the means for setting at least one software flag in a software manifest memory slot sets a separate calibration flag for each calibration file in one or more calibration flag manifest slots.

* * * * *